Feb. 8, 1966  E. IGNELZI  3,233,536
VENDING APPARATUS ADAPTED TO STORE AND PROCESS FOOD ITEMS
Filed Nov. 14, 1963  7 Sheets-Sheet 1

Eugene Ignelzi
INVENTOR
BY Jacobi & Davidson
ATTORNEYS

Eugene Ignelzi
INVENTOR

Feb. 8, 1966 E. IGNELZI 3,233,536
VENDING APPARATUS ADAPTED TO STORE AND PROCESS FOOD ITEMS
Filed Nov. 14, 1963 7 Sheets-Sheet 6

Eugene Ignelzi
INVENTORS

BY Jacobi & Davidson
ATTORNEYS

United States Patent Office 3,233,536
Patented Feb. 8, 1966

3,233,536
VENDING APPARATUS ADAPTED TO STORE
AND PROCESS FOOD ITEMS
Eugene Ignelzi, 10697 W. 25th Ave., Lakewood 15, Colo.
Filed Nov. 14, 1963, Ser. No. 323,852
15 Claims. (Cl. 99—357)

This invention relates generally to equipment for storing and automatically processing food items, and is particularly concerned with the provision of a vending machine capable of storing fresh food items under refrigerated conditions, and automatically processing the same, as by cooking.

Food vending machines have come into widespread use, particularly in recent years, and it is common practice at the present time to utilize vending machines which store not only the non-perishable items, but which also store and dispense perishable items or food items including a perishable content. Apart from the vending machine developments, there has been increased use of automation in handling food items, including the handling thereof for cooking or like purposes.

Notwithstanding the advances which have been made in the vending machine field, and notwithstanding the advances which have been made in the automatic processing of food items, there remains a need for a simply constructed and efficiently operable vending machine capable of storing fresh food items under refrigerated conditions, and further capable of cooking such food items for a preselected time, whereby a purchaser can, in response to depositing of selected currency within a device on the machine, obtain a cooked food item of his choice. More particularly, and by way of example rather than limitation, there is a need for a vending machine which is capable of delivering cooked pizza pies to a consumer in response to the consumer's depositing coins in a coin-receiving apparatus on the machine.

The requirements for handling comparatively solid items, such as pizza pies, greatly differ from the requirements for handling liquid items, such as soups. Specifically, with the liquid items, it is only necessary to provide a refrigerated container, and a selectively operable valve means, preferably of the measuring type, to dispense the liquid into another container for heating thereof. In contrast, when solid type items are handled, it is necessary to provide for a transfer of the food item from a refrigerated compartment to a cooking compartment through the use of a simply operated and efficient transfer means which does not disturb the characteristics of the solid food item, by agitating or mixing the same so as to disturb the physical characteristics thereof. Still further, in handling solid food items which are stored under so-called "frozen" conditions, it is necessary to overcome problems such as sticking of the frozen item to its associated support, undercooking or overcooking of the item during processing, and refilling of the apparatus with the fresh food items under convenient conditions and with simple operations which can be satisfied by service personnel lacking any special mechanical dexterity.

Bearing in mind the foregoing, it is a general object of the present invention to provide a vending apparatus which meets the aforesaid requirements, and which is conveniently and efficiently operable to store frozen food items under refrigerated conditions, and to cook the same properly in response to activation of the apparatus by a consumer. Still further, in this general regard, it is an important object of the present invention to provide such an apparatus which is capable of efficiently handling several different types of food products, or several different varieties of the same type of food product, so that a user is given a selection of items from which to make a choice.

The apparatus provided by the invention incorporates a housing including two compartments separated by an insulating wall therebetween. One of such compartments is maintained under refrigerated conditions, whereas the other of such compartments includes means for cooking a food item. In line with this general arrangement, the invention has certain specific objects which relate to the overall apparatus design, the manner in which an item is stored in the refrigerated compartment, the manner in which an item is transferred from the refrigerated compartment to the cooking compartment, the manner in which an item can be preheated or precooked in the cooking compartment before being finally processed therein, and the manner in which the apparatus is selectively movable from location to location within a given area and automatically fixed in a given position.

In more detail, a specific object of the present invention is to provide a vending apparatus conforming with the preceding objects wherein the consumer can view the transfer of a food item from the refrigerating compartment to the cooking compartment, and can also view the item as it is processed in the cooking compartment. In other words, in this regard, it is an object of the present invention to provide an apparatus which is attractive to a consumer by virtue of the fact that the operations carried out thereby can be watched as general entertainment to the consumer while he is awaiting the delivery of a cooked food product which he has selected.

Consistent with the above general and basic specific objects of the invention, there are certain more detailed objects hereof, including the following: (a) the provision of an apparatus conforming with the preceding objects wherein the means for transferring a food item from the refrigeration compartment to the cooking compartment positively removes the food item from a support on which it is maintained in the refrigerating compartment whereby the operation is not rendered ineffective even if the item is "frost stuck" to its associated support in the refrigerated compartment; (b) the provision of such an apparatus which is adapted to handle in any given compartment arrangement, a substantial number of food items whereby the machine need not be constantly serviced during normal operation and normal consumption requirements therefrom; (c) the provision of such a machine which effectively utilizes the force of gravity to transfer a food item from the refrigerated compartment to the cooking compartment so that the transfer is free of any requirement of complicated mechanical parts, and free of any ineffectiveness due to defects in the transfer mechanism; (d) the provision of such an apparatus which is effective to store the food items under refrigerated conditions, and which is at the same time effective to cook such items, in the same apparatus, even at cooking temperatures of the order of 1000° F. or higher; (e) the provision of such an apparatus wherein the refrigerated compartment is adapted to be refrigerated by a single refrigerating unit and is adapted to support at respectively spaced locations different types of food items, or food items of the same type but having different characteristics; (f) the provision of such an apparatus which incorporates simple electrical control means for effecting a sequential operation of the machine in response to activation thereof by an operator; and (g) the provision of such an apparatus which is durable in operation and which can be manufactured from existing materials so as to be available at a profitable commercial price.

In a basic sense, the invention provides a vending machine which satisfies the aforesaid objects by storing a plurality of food items in a refrigerated compartment on a carriage or rack movable therein, by moving the carriage or rack to a given dispensing location, by removing from the carriage or rack a food item carried thereby, by directing such food item from the refrigerated compartment into a cooking compartment, and by processing the food item in the cooking compartment. Effective insulation between the refrigerated compartment and the cooking compartment is achieved through the use of an insulating wall and a movable door for selectively opening and closing a passageway therein whereby a food item may be passed therethrough. The cooking process, if desired, and in accordance with the preferred embodiment hereof, can be a two-step process wherein the food item is first maintained in a given position and preheated, and then processed by movement on a conveyor under a cooking means to obtain final cooking.

Aside from the overall apparatus, the invention provides a vending machine which is selectively movable on wheel means from location to location in a given area only when an access door is open. Additionally, the invention provides a vending machine adapted to cook items at substantial temperatures wherein a conveyor means is used to transfer the food items under the cooking means without subjecting the drive elements of the conveyor means to the extreme heat which may be encountered in the cooking compartment.

The invention resides in the combination, arrangement, and construction of the overall apparatus, as well as in certain subcombinations and arrangements incorporated in the overall machine. The invention will be better understood, and objects other than those set forth above will become apparent, when consideration is given to the following detailed description. Such description makes reference to the annexed drawings presenting preferred and illustrative embodiments of the invention.

Figures 2, 18A:
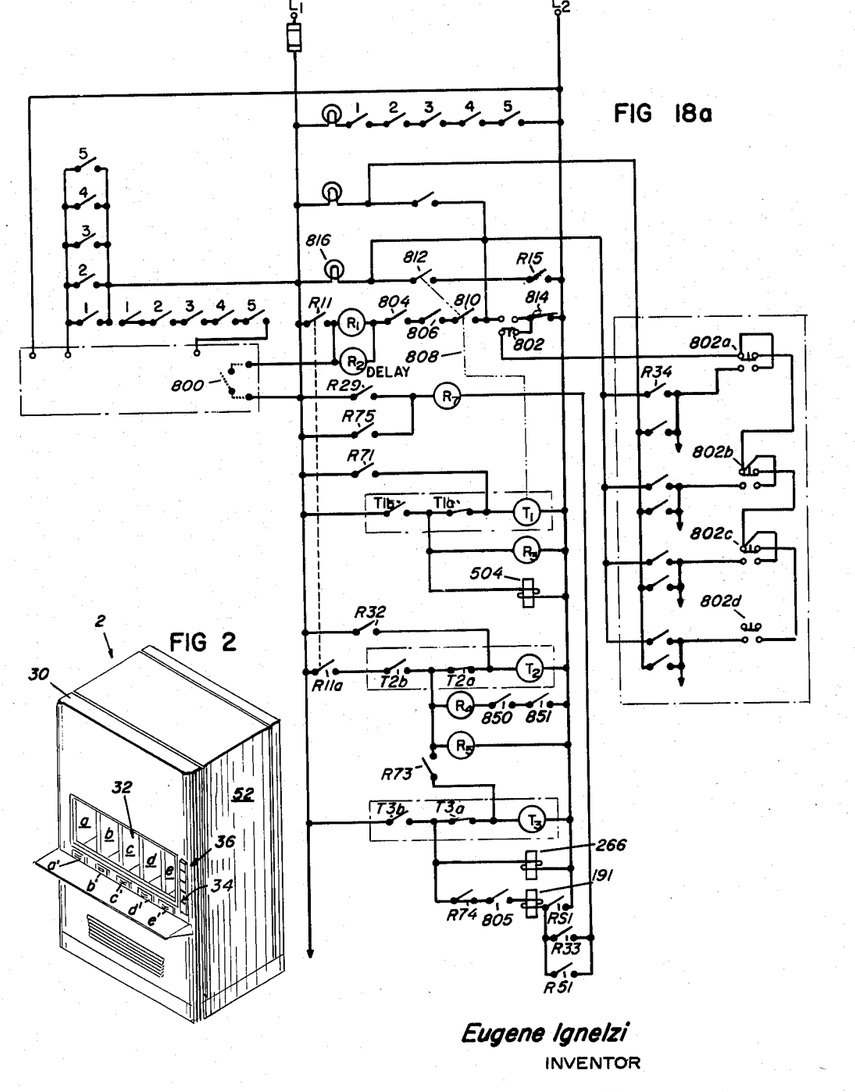
FIGURE 2 is a perspective view of the vending apparatus of FIGURE 1 as seen from the front thereof.
FIGURES 18a, 18b and 18c are schematic diagrams of the control system preferably used in the vending apparatus of the present invention.

A machine constructed in accordance with the present invention may ultimately have an appearance similar to that shown in FIGURE 2. By referring to such figure, it will be noted that the machine, as generally designated by the numeral 2 has a front door 30 which is swingable about a vertical hinge arrangement (not shown) to provide access to the interior of the machine. A transparent panel arrangement 32 is provided in the front door so that a consumer can view the processing of a food item within the cooking compartments a, b, c, d or e. Moreover, associated with each such cooking compartment is an access door or tray a', b', c', d' and e', respectively, which permits the consumer to remove an item from within one of the cooking compartments a–e. A series of control buttons cumulatively generally designated by the numeral 34 are provided so that the user may select the type of food item, or the particular content thereof, which is desired. Moreover, a coin receiving slot assembly, generally designated by the numeral 36 is provided on the machine so that a consumer can insert a particular currency amount in the machine to effect operation thereof.

A machine such as shown in FIGURE 2 is adapted to handle differing types of food items, but by way of example, the same can well be considered as used in the handling and dispensing of pizza pies. In other words, for convenience of description, it has been assumed that the machine hereof is handling pizza pies of five different types. It is to be understood, however, that the machine can be used for handling other food items, and that the handling of pizza pies is presented merely for exemplary purposes.

Figures 1, 9:
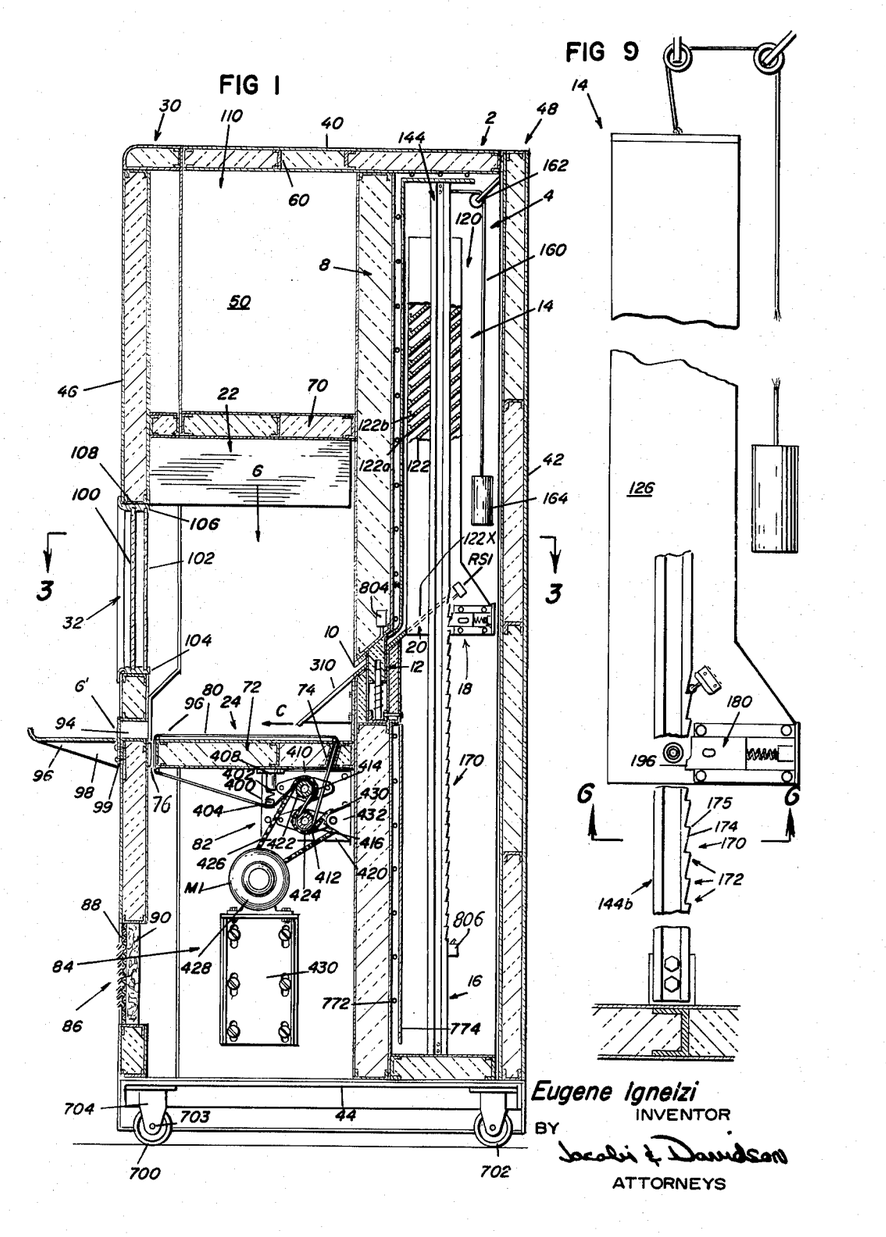
FIGURE 1 is a longitudinal sectional view of a vending apparatus constructed in accordance with the present invention.
FIGURE 9 is a side elevation of the aforesaid carriage and associated movement controlling components.

By referring to FIGURE 1, it will be noted that the vending machine provided hereby includes a housing means generally designated by the numeral 2, which housing means has at least two compartments 4 and 6 therein. The compartments 4 and 6 are separated by an insulating wall 8 having a passageway 10 therein through which food items can pass from the compartment 4 to the compartment 6.

A door means generally designated by the numeral 12 is included for selectively opening the passageway 10 in the insulating wall 8. Moreover, in the compartment 4, there is a carriage means 14 which supports a plurality of food items in individually spaced apart relation thereon. A guide means 16 works in cooperation with a latching means 18 to mount the carriage means 14 in the compartment 4 for vertical step-by-step movement adjacent the passageway 10 whereby individual food items are positioned to be passed through the passageway 10 in the insulating wall 8.

A delivery means generally designated by the numeral 20 cooperates with the carriage means 14 for removing food items therefrom and directing the same in a path through the passageway 10.

In the compartment 6, a cooking arrangement including a heating means 22 and a conveying means 24 is incorporated so that a food item which has been removed from the carriage means 14 and passed through the passageway 10 is cooked within the compartment 6.

Control means are provided for selectively moving the carriage means to positions where items carried thereby are adjacent the passageway, for moving the door means to a position opening the passageway to permit a food item to pass therethrough and for cooking a food item which has passed through the passageway and into the compartment 6.

The above basic general description of the overall machine is presented as a foundation on which the reader can base his understanding of the disposition and cooperation of the various means, sub-combinations and arrangements which cooperate to provide the desired result. Although the differing means, sub-combinations and arrangements are functionally interrelated to store, deliver, cook and vend a food item, the invention can be somewhat better understood by individually considering each of the general means or sub-combinations referred to above. Accordingly, such means and sub-combinations are discussed separately below.

THE HOUSING MEANS

The housing means 2, as shown in FIGURE 1, preferably takes the form of a box-like structure having a top wall 40, a rear wall 42, a bottom wall 44, and a front wall 46. The door 30 effectively provides the front wall 46 and similarly a door 48 preferably provides the back wall 42. The door 48 is hingedly connected with the remainder of the housing means 2 by a suitable hinge (not shown) cooperating between the door 48 and the end wall 50 of the housing. The end wall 50 shown in FIGURE 1 is opposite the end wall 52 shown in FIGURE 2. Yet, it should be apparent that the top, bottom, front, rear and side walls form an elongated enclosed housing through which entry is provided to the interior forward portion through the door 30 and to which entry is provided to the rear interior portion through the door 48.

The top, front, rear and side walls, as shown, are preferably of the so-called "double wall type" including an exterior panel and an interior panel spaced from the exterior panel by suitable cross members such as those designated by the numeral 60.

The insulating wall 8, as explained above, is disposed longitudinally within the housing means 2 between the top wall 40 thereof and the bottom wall 44 thereof. The insulating wall 8 is formed of any suitable insulating type materials such as asbestos, insulating plastic foam, or the like. The important point is not to note the particular material from which the insulating wall is formed, but instead, the fact that the insulating wall provides an effective insulation longitudinally of the housing means 2 so as to effectively seal the compartment 4 from the remaining compartments in the housing means 2.

All of the walls of the housing with the possible exception of the bottom wall are preferably insulating type walls since each serves either to prevent heat transfer between the compartment 4 and the compartment 6, or the escape of heat from the compartment 6, or the transfer of heat to and within the compartment 4.

Aside from the insulating wall 8 which extends longitudinally of the housing means 2, there are preferably two additional transverse walls 70 and 72 disposed within the housing means 2. The wall 70 extends from the insulating wall 8 forwardly and terminates adjacent the inner side of the front wall 46. The transverse wall 72 similarly extends forwardly from the insulating wall 8, terminating adjacent the inner side of the front wall 46. The walls 70 and 72 are disposed in spaced apart relation to one another so as to define the compartment 6 therebetween. Moreover, these walls effectively serve somewhat different functions.

The wall 70 serves primarily as a support wall for the heating means, as described more fully below. On the other hand, the wall 72 has its upper face serving as a partial support for a conveyor means which is utilized in accordance herewith, as also explained more fully below. Suffice it to say at this point in this specification, the lower transverse wall 72 includes a pair of openings 74 and 76 therein, which openings are spaced apart, and which openings are adapted to receive a conveyor belt 80 therethrough.

The conveyor belt 80 as well as the drive assembly 82 therefor are discussed in more detail below. However, it should be here noted that the drive means 82 for the conveyor belt 80 is disposed in a lowermost compartment 84 below the transverse wall 72. The compartment 84 is designed to not only house the conveyor drive means 82, but also other mechanical and control components included in the apparatus. To properly ventilate such means and components, the front wall 46 on the front door 30 carries in the base portion thereof a ventilating means 86 which takes the form of a louvered panel 88 and a filter 90 supported in any conventional manner behind the louvered panel 88.

The front door 30 or front wall 46 is interrupted at two further places, namely in the area of the access doors $a'-e'$ and in the area of the viewing panel arrangement 32. As shown in FIGURE 1, an access door $b'$ blocks a passageway 94 leading from the exterior front of the machine into the compartment 6. It is through this door that a consumer receives a food item which has been processed in the compartment 6. The door $b'$, is but one of five access doors of the machine, shown in FIGURE 2, each of which is designed to permit forward delivery and receipt of a cooked food item from one of the compartments $a-e$ inclusive.

Extending forwardly of the wall 46 and to facilitate receipt of a cooked food item, is a shelf 96. Such shelf is supported in position adjacent the lower side of the passageway 94 by means of a suitable bracket such as the bracket 98. The bracket 98, and thereby the shelf 96 are fixed to the front wall 46 by any suitable means such as the rivets 99.

While the access door $b'$ and similar doors $a'$, $c',-e'$, permit the consumer to receive a cooked food item from within the compartment 6, the same do not provide for any substantial view within the machine. However, being able to view the operation of the machine provides a substantial advantage in that it holds the consumer's attention during processing of the food item. Accordingly, consistent with the invention, the viewing panel arrangement 32 is incorporated. This arrangement includes a pair of transparent, preferably glass panels 100 and 102 supported in spaced apart parallel relation by bottom and top support rail 104 and rail 106 which extend across the bottom and top of an opening 108 in the front wall 46. The rails cooperate with the panels to effectively provide a seal around the panel so that the panels prevent excessive heat escape from the compartment 6. The panels 100 and 102, or the viewing panel arrangement, are so disposed that they extend substantially entirely across the forward face of the machine to permit a consumer to view the cooking process within any one of the compartments $a$, $b$, $c$, $d$, or $e$.

It should be readily apparent from the preceding description that the housing means is so constructed as to provide a rear-most compartment 4, a generally centrally disposed forward compartment 6, and a lower forward compartment 84. Additionally, there is a storage compartment 110 which is disposed above the transverse wall 70, and which serves as an upper forward compartment.

From the food handling standpoint, only the compartments 4 and 6 are important. However, from the operational standpoint, the compartment 84 is of particular significance since it houses the drive components and control means. The compartment 110, on the other hand, can be used for the storage of spare parts, for the storage of tools, or for similar storage purposes.

THE CARRIAGE MEANS AND SUPPORTING ASSEMBLY

The carriage means 14, as indicated above, serves as the means for delivering the food items adjacent the passageway 10 in the insulating wall 8 whereby the same can be transferred into the compartment 6 for further processing. In accordance with the invention, the carriage means 14 preferably comprises an elongated frame 120 having a plurality of inclined trays 122, 122a, 122b, etc. thereon for supporting food items. While only one carriage means 14 has been referred to above, it will be noted from FIGURE 3 that in the embodiment shown, there are actually five carriage means, 14a, 14b, 14c, 14d, and 14e. The respective carriage means are disposed in side by side relation, and each carriage means is effectively identical to the other. Accordingly, the carriage means has been generally designated by the numeral 14 in FIGURES 1, 4, 5, 6, 7 and 8 subject to the understanding that the description of the carriage means 14 is applicable to any one of the individual carriage means 14a, 14b, 14c, 14d and 14e, unless otherwise noted below.

Figure 3:
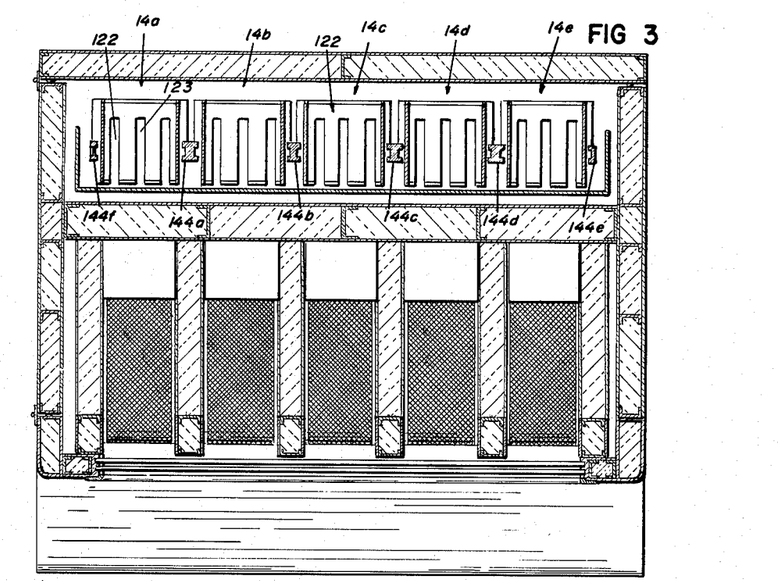
FIGURE 3 is a sectional plan view taken along the line 3—3 of FIGURE 1, showing the article support and handling arrangements utilized in the preferred embodiments hereof.
Figure 6:
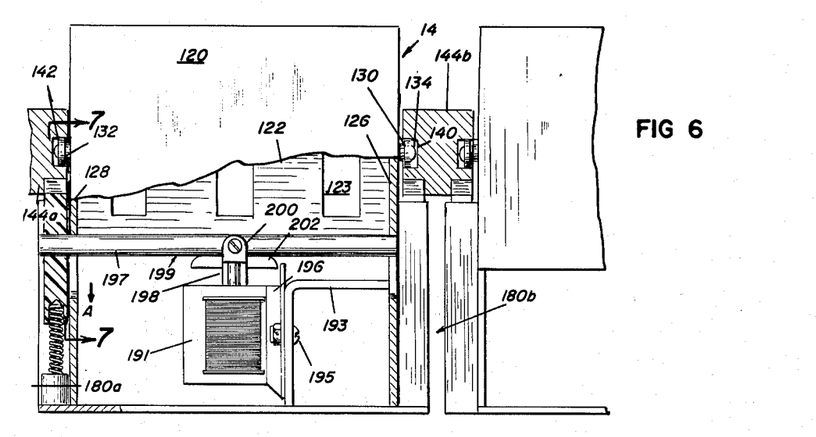
FIGURE 6 is a bottom sectional view taken along the line 6—6 of FIGURE 9, showing in detail the mechanism and controls for handling articles in the refrigerated section of the apparatus of FIGURE 1.

As best shown in FIGURE 6, the elongated frame 120 includes a pair of side frame members 126 and 128 between which the trays 122 are supported. In effect, the trays 122 serve as transverse members supporting the side members 126 and 128 in parallel spaced apart relation thereby forming an overall elongate frame wherein each of the tray members extends between the opposite side members of the frame. As also shown in FIGURE 6, a pair of guide rollers 130 and 132 are supported on opposite sides of the frame 120 so as to project respectively beyond the side members 126 and 128. Each roller is supported in position by a suitable shaft bolt 134. The rollers 130 and 132 ride in spaced apart facing guide channels 140 and 142 provided respectively in guide posts 144a and 144b. The posts 144a and 144b, as shown in FIGURE 3 actually support the carriage means 14. However, corresponding posts 144c and 144d (FIGURE 3), are of identical construction to the posts 144a and 144b described above. The end guide posts 144e and 144f (FIGURE 3) are also of the same type of construction, but each of the end guide posts only has one guide channel therein, whereas the intermediate posts 144a–144d each have two guide channels therein facing in respectively opposite directions.

By virtue of the guide post construction described above, and the cooperation thereof with the guide rollers projecting from the sides of each carriage means, each carriage means is supported for longitudinal or vertical movement within the compartment 4; the posts extending vertically in such compartment between the top thereof and the bottom thereof.

While only one pair of guide rollers has been shown as associated with the carriage means 14 in FIGURE 6, it is to be understood that preferably a pair of vertically aligned guide rollers is provided on each side of the carriage means projecting from the adjacent side member of the carriage means so that it is prevented from effectively tilting during its movement within the compartment 4.

Again referring to FIGURE 1, it will be noted that the carriage 14 has a length which is substantially shorter, and preferably of the order of one-half of the length of the compartment 4. The carriage is thus movable from a position where its lowermost tray 122x is adjacent the passageway 10 to a position where its uppermost tray is adjacent such passageway.

Movement of the carriage 14 is achieved through gravitational descent. More particularly, as also shown in FIGURE 1, a cable 160 leads from the upper end of the carriage and is trained about a pulley 162 supported at the upper rear corner of the compartment 4. The cable 160 then extends vertically downward, carrying at its lower end a counter-balance weight 164. Preferably, the counter-balance weight is of substantially the same magnitude as the weight of the carriage 14 so that the carriage 14 tends to move vertically downward without having any pizza pies loaded thereon, but would not move downwardly with any substantial force. In other words, the invention contemplates using a carriage which is so counter-balanced that it will slowly move downwardly under its own weight, but at a more rapid speed when loaded with food items on each of the supporting trays thereof.

To control the action of the carriage means, each of the guide posts 144 preferably is provided with a ratchet rack extending down one edge thereof, namely, a ratchet rack such as that designated by the numeral 170 in FIGURE 1.

As shown more clearly in FIGURE 9, the ratchet rack 170 has a plurality of teeth 172, each of which has an inclined outwardly tapered surface 174 terminating in a horizontally disposed step edge 175. The teeth 172 extend from a position spaced from the bottom of the housing means or compartment 4 at least half way up each guide post 144 according to the preferred embodiment. However, the teeth may extend over a greater distance or over less of a distance depending upon the desired travel limitations for the carriage 14. The ratchet rack 170 on each guide post cooperates with a ratchet stop 180 carried on a side member of the carriage 14.

Figures 7, 8, 17, 19:
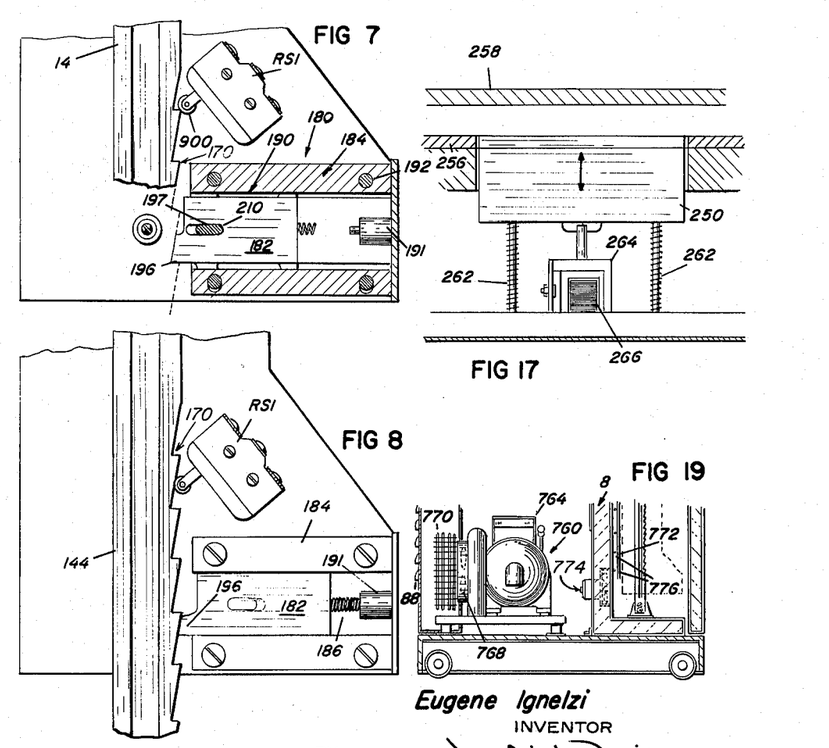
FIGURE 7 is an enlarged detailed view of a latching means used with a carriage of the handling mechanism in the refrigerated section of the apparatus to control movement thereof.
FIGURE 8 is an enlarged detail view similar to FIGURE 7 but showing the latching means in a position assumed during descensions of the handling mechanism carriage.
FIGURE 17 is a front sectional view taken along the line 17—17 of FIGURE 10, showing the door panel of the article transfer system in its closed position.
FIGURE 19 is a side view of the refrigeration unit and fan means incorporated in the apparatus hereof to refrigerate a compartment thereof.

If it is assumed that the carriage 14 shown in FIGURE 6 corresponds to the carriage 14 shown in FIGURE 9, then the post 144a carries the ratchet rack 170 and the side wall 128 of the carriage 14 carries the ratchet stop 180, both as shown in FIGURES 7 and 8. The ratchet stop 180 comprises a stop member 182 which is mounted in a slideway 184 and normally biased to the left or outwardly as shown by a suitable spring 186.

The cooperation between the stop member 182 and the slideway 184 is preferably achieved though a dovetail slide 190. The slideway 184 is fixed to the side wall 126 by any suitable means, such as by rivets 192 or by welding.

As shown in FIGURE 6, a ratchet stop means is provided on each side wall member of each carriage. Thus, the carriage 14 shown in FIGURE 6 has a ratchet stop means 180a carried on the left side thereof as shown and a ratchet stop means 180b carried on the right side thereof as shown. These ratchet stop means are identical in construction, and the preceding description of the ratchet stop means 180 is accordingly applicable to these respective ratchet stop means 180a and 180b.

It is to be noted from FIGURES 1, 6 and 9 that each of the ratchet stop means 180 is preferably disposed at or toward the base of its associated carriage means and that each of the ratchet stop members 182 forming part of each ratchet stop means 180 has a forwardly projecting stop tooth 196 which is of conforming contour with the teeth 172 on the ratchet rack 170.

As should be apparent from FIGURES 1, 7 and 9 a carriage 14 is maintained at a given vertical level whenever a ratchet stop tooth 196 of an associated ratchet stop means 180 is in engagement with one of the cooperating teeth 172 on the associated ratchet rack 170. Consistent with this approach, it can be assumed that the carriage 14 of FIGURE 1 is in its uppermost position, and that the ratchet stop means 180 is maintaining such carriage in its uppermost position. Here, it should be recalled that the weight of the carriage means 14 at least if loaded, and preferably even if not loaded, is greater than the effective weight of the counterweight 164. Accordingly, the carriage 14 is tending to descend vertically under the action of gravity. The ratchet stop means 180 thus serves to prevent the downward descent when a ratchet stop tooth 196 thereof is in engagement with one of the teeth, or specifically, one of the horizontal stop faces 175 of an associated ratchet tooth 172 on a ratchet rack 170.

With the ratchet stop means and cooperating ratchet racks associated with each carriage means, it is necessary to move a ratchet stop member rearwardly or to the right in the figures discussed above in order to permit the carriage means to descend vertically. To this end, as shown in FIGURE 6, each carriage means has supported thereon an activating solenoid 191. The solenoid 191 is preferably supported in position by a right angle bracket 193 to which the solenoid is fixed by a suitable nut and bolt 195 cooperating between the bracket 193 and a flange 196 extending from each solenoid. The solenoid 191 has a reciprocal core 198 which projects forwardly thereof and connects with a release rod 197 extending transversely across each carriage means. The release rod 197 is fixed to the end of the core 198 by a coupling 199 including a U-bracket 200 and a non-pivotal rod 202. The U-bracket 200 and non-pivotal rod 202 together with the elongate shape of the release rod 197 serves as an effective means to prevent pivotal movement of the release rod 197 with respect to its connection with the core of the solenoid. In other words, opposite ends of the release rod 197 are moved rearwardly simultaneously, i.e., moved in the direction of the arrow A (FIGURE 6) upon energization or activation of the solenoid.

As shown in FIGURE 7, the ends of the release rod 197 project into and through a suitable slot 210 disposed centrally and longitudinally of each of the ratchet stop members 182. In fact, the release rod 197 serves as a stop for the forward movement of each stop member 182 under the action of the spring 186 normally biasing the same forward, or to the left as shown.

When the solenoid 191 is energized, the core 198 thereof is pulled inwardly or in the direction of the arrow A (FIGURE 6) and this results in moving the release rod 197 rearwardly. In turn, the release rod 197 causes each of the stop members 182 disposed at opposite ends thereof to move rearwardly, and this results in having the associated stop teeth 196 disengage the tooth of the racket rack 170 with which they were previously engaged. As a result, the carriage 14 moves downwardly, but downward movement by more than one step—i.e., by more than one ratchet tooth 172, is prevented since the solenoid is only activated or energized momentarily, and as shown in FIGURE 8, the stop tooth 196 on the stop member 182 immediately engages the next adjacent tooth along the tapered surface 174 on the ratchet rack 170 whereby the carriage comes to rest when the stop tooth 196 engages the horizontal stop surface 175 next below the stop surface with which it was previously engaged.

To reiterate and simplify the above description, the carriage is initially supported in a given vertical position by virtue of the fact that the ratchet stop means carried on opposite sides thereof are in engagement with associated ratchet racks carried on each of the adjacent guide posts 144. When the solenoid 191 carried by a given carriage means is operated or activated, the solenoid pulls its own core in thus pulling a release rod 197 rearwardly. The release rod 197 in turn moves the ratchet stop members associated therewith rearwardly whereby the same clear the horizontal stop surface of teeth on the ratchet racks with which such stop members were previously engaged. The carriage then begins to descend, and simultaneously, the associated solenoid is released, whereupon the ratchet stop member of each ratchet stop means moves forwardly under the action of the associated biasing spring in its ratchet stop means. Accordingly, the ratchet stop members, or more particularly the projecting stop tooth 196 of each ratchet stop means engages the next vertically downward stop surface on the ratchet rack whereupon the carriage is fixed in a next successive lower vertical position.

During all of such time, the carriage is guided in its movement by virtue of the cooperation of the guide rollers projecting from opposite side members of the carriage and cooperating with the guide channels in the adjacent guide posts.

THE INTER-COMPARTMENT DOOR MEANS

Figures 4, 5, 18B, 18C:
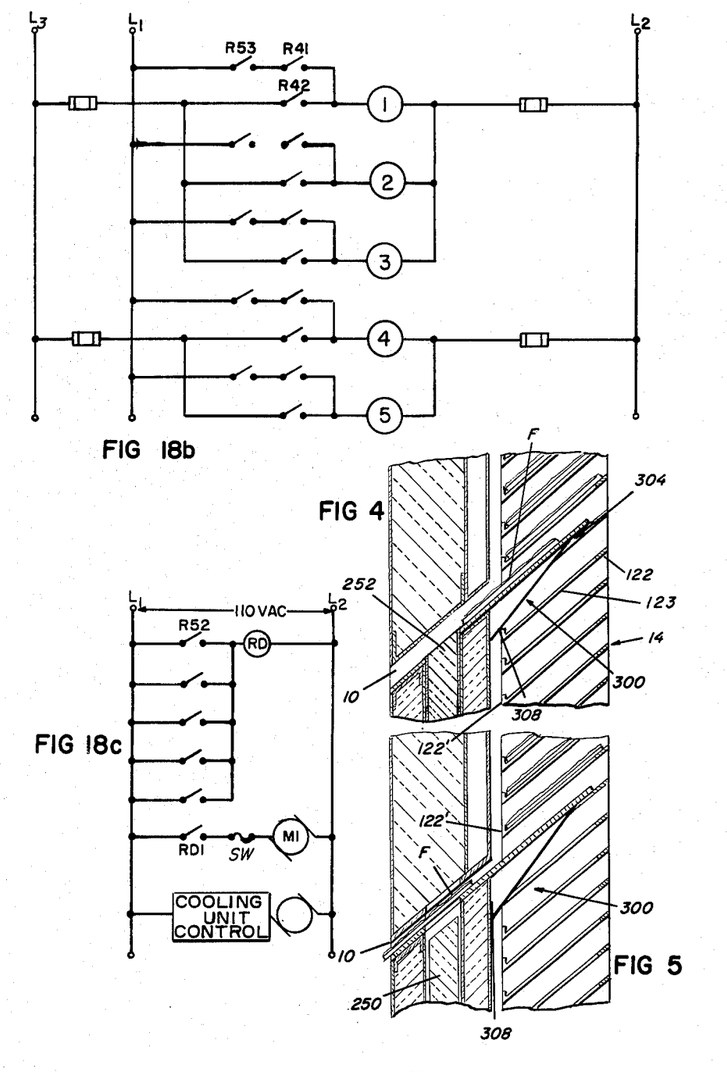
FIGURE 4 is an enlarged fragmental detailed view of an article transfer system used in the apparatus of FIGURE 1, for transferring an article between compartments.
FIGURE 5 is an enlarged detailed view, similar to FIGURE 4, but showing a door panel of the transfer system in an open position, as opposed to the closed position assumed by the same door in FIGURE 4.
Figure 10:
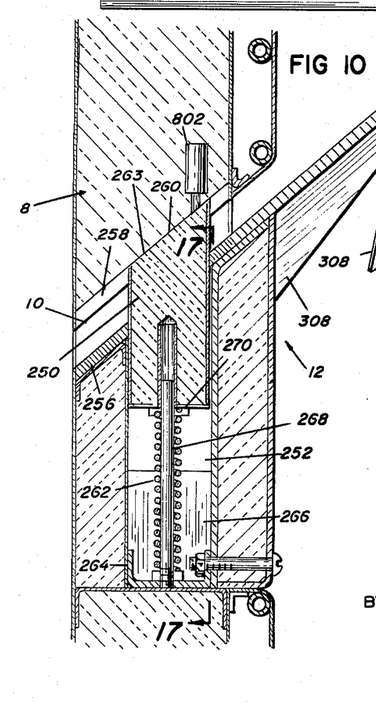
FIGURE 10 is a further enlarged detail view of the article transfer system shown in FIGURE 4, and FIGURE 10 presenting the cooperation between different elements of such system.

The door means 12 as shown in FIGURES 1, 4 and 10 is disposed between the compartments 4 and 6 and effectively serves to seal the insulating wall 8 except during time periods when a food item is being delivered or transferred from the compartment 4 to the compartment 6. The door means 12, as shown in FIGURE 10, includes a reciprocal door panel 250 which is mounted for reciprocal movement in a recessed area 252 in the insulating wall 8. The passageway 10 in the insulating wall 8 is inclined downwardly from the rear compartment 4 into the forward compartment 6 and is defined on opposite sides by a pair of plate members 256 and 258 disposed respectively at the bottom and top of the passageway 10. The reciprocal door panel 250 has an inclined upper surface 260 which mates with the upper recessed surface 263 disposed intermediate opposite ends of the upper wall 258 of the passageway 10. More specifically, the plate member 258 has a longitudinal recess therein which receives the upper end portion 260 of the door panel 250. Similarly, the lower plate member 256 has a longitudinal recess therein through which the door panel 250 is reciprocal in operation.

In FIGURE 10, the door panel 250 is shown in its closed position, and as being biased into such position by a spring means 262 which pushes the door panel 250 upwardly by reacting between the lower end of the door panel 250 and the base of the recess 252, or specifically, a solenoid bracket 264. A solenoid 266 is supported on the solenoid bracket 264 and a solenoid core shaft 268 extends upwardly from the solenoid connecting it with the door panel 250 by a coupling 270 which may be of any suitable form.

In normal operation, the door panel 250 is disposed in the upward position shown with the upper portion thereof effectively providing a seal in cooperation with the adjacent edges of the recess 263 in the upper plate 258, and with the central portion of the door panel 250 providing an effective seal with the adjacent edges of the recess in the lower plate member 256. When, however, the solenoid 266 is activated or energized, the same causes the core shaft 268 to be attracted downwardly as shown in FIGURE 5. This results in compressing the spring means or coil spring 262 and lowering of the door panel 250 until the upper edge thereof 260 is disposed in alignment with the upper face of the lower plate member 256. At this time, the door member has assumed the position shown in FIGURE 5 with the upper edge 260 thereof forming part of the lower passageway wall. Prior to such time, as shown in FIGURE 4, the door panel 250 was in its raised position.

The supporting structure associated with the door panel and with the insulating wall shown in the drawings but not described above merely serves as a means for retaining the door panel in position, and preventing the same from destructively coacting with the insulating wall itself. Any suitable sealing arrangement, and/or supporting structure may be used without departing from the scope and spirit of the invention since the essential factor is that there be a door means intermediate the respective compartments 4 and 6, which door means provides an effective insulating seal between such compartments under normal circumstances, and open a passageway only when it is desired to pass a food item from the compartment 4 to the compartment 6. At the same time, it is important to note that the passageway is inclined since, as indicated above, a food item is delivered under gravitational action in accordance with the preferred embodiment hereof.

THE DELIVERY MEANS

In preceding sections of this specification, the manner in which the carriage means is lowered from position to position by step to step movement, and the manner in which the door means intermediate the compartments 4 and 6 is operated, has been described in some detail. These operations, however, merely serve to position a food item for transfer from one compartment to another and to permit the transfer to take place. It is necessary that a delivery means, preferably in the form of the delivery means 20, be provided to cooperate with the carriage means 14 for removing a food item therefrom and directing the same in a path through the passageway 10. Of course, here again, it is to be understood that the door means described above is but one of five door means, each of which door means cooperates between the compartment 4, and one of the processing compartments $a$, $b$, $c$, $d$, or $e$ disposed within the overall compartment 6. In a like sense, the delivery means now to be described is but one of five delivery means incorporated in the embodiment shown in the drawings. Still, in each instance, the operation of the door means and of the delivery means is the same regardless of its particular position in the housing, and regardless of the particular carriage means with which it is designed to cooperate.

To fully understand the operation of the delivery means, it is necessary to again refer to the trays 122 which are supported on respective carriage means. As best shown in FIGURES 3 and 6, each of the trays is provided with a plurality of elongated recesses or openings 123 which extend from the forward edge of the tray, i.e., the front portion thereof or edge thereof adjacent the insulating wall and terminate short of the rear edge of the trays. Preferably such recesses or openings 123 are disposed in parallel and equally spaced apart relation. Moreover, each of the trays is inclined as shown in FIGURE 1, upwardly from the forward edge thereof toward the rear edge thereof, or in alternative language, downwardly inclined toward the insulating wall. To repeat, each of the trays has a plurality of recesses therein extending from the edge thereof most adjacent the insulating wall toward the rear edge of the tray. Moreover, each of the trays is inclined in the same direction. These particular features are of significance because it is these features which permit the particular transfer cooperation now to be described.

Figure 11:
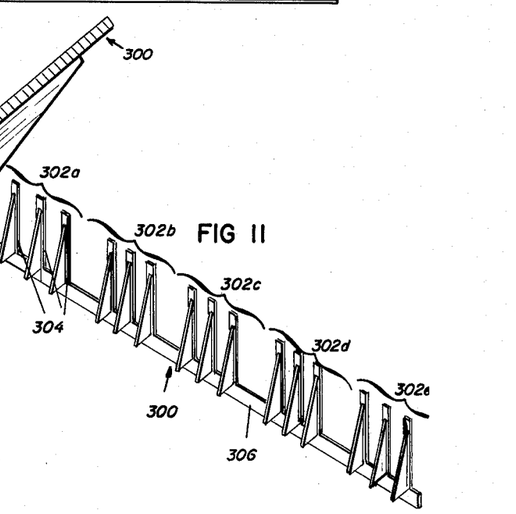
FIGURE 11 is a perspective view of a transfer element of the system shown in FIGURE 10.

In FIGURE 11, a transfer element 300 is shown. This element includes a plurality of groups 302a–302e of fingers 304 which are supported in forwardly projecting relation from a rear cross member 306. The fingers 304 are so disposed and so shaped that they are designed to respectively pass through aligned openings or recesses 123 in trays 122 moving therepast.

As shown in FIGURES 4 and 5, the transfer member 300 is supported in position by a group of generally triangular brackets 308 which preferably are provided in sufficient number so that one such bracket cooperates with each finger 304. The brackets support the transfer member or element 300 on the insulating wall so that respective groups of fingers 302a, 302b, 302c, 302d and 302e are disposed to cooperate with respective trays 122 carried on respective carriage means 14a, 14b, 14c, 14d and 14e.

More particularly, in the arrangement just described, the trays are inclined downwardly from the rear portion thereof to the forward portion thereof toward the insulating wall 8. Each of the trays comprises a platelike support 122 having an upstanding lip 122' and also having a plurality of elongated openings 123 extending from the forward portion thereof toward the rear portion thereof. The forward portion of each of the trays is disposed adjacent the insulating wall, and the delivery means comprises the transfer element 300 including a plurality of fingers 304 inclined upwardly from the insulating wall in position to move freely through the elongated openings 123 in the trays 122.

In addition to the aforesaid positioning, the fingers 304 are so disposed in operative position that their uppermost face is disposed at least slightly above the uppermost face of an associated tray when the associated tray is in a fixed vertical position assumed by the carriage means. Specifically, as shown in FIGURE 4, where the carriage 14 has assumed one of its vertical step-by-step positions, the finger 304 is disposed slightly above the tray 122. Bearing in mind this disposition, it will be understood that as the carriage 14 drops from one vertical level to its next adjacent vertical level, the fingers 304 move through the openings in the next adjacent tray thereby lifting a food item supported thereon above the tray 122 and the lip 122'. In essence, the fingers 304 lift the food item slightly above the level of the associated tray. Even if the item should be "frost stuck" to the associated tray, there is here a positive release under the gravitational force of downward movement of the associated carriage means 14.

To reiterate, as the carriage means 14 moves downwardly, the fingers of the transfer element associated therewith move through the openings in a tray, thereby lifting a food item carried by the tray therefrom and supporting the same on the fingers. The fingers are inclined downwardly, as shown in FIGURES 4 and 5, so that the food item F tends to slide forwardly and downwardly into the passageway 10. If the door is closed, naturally the food item is stopped thereby, but as soon as the door opens, as shown in FIGURE 5, the food item immediately passes through the passageway 10.

To accommodate the food item as it leaves the passageway 10 and enters the compartment 6, a chute 310, such as shown in FIGURE 1, can be provided to direct the food item onto the conveyor belt 80. Alternatively, as explained more fully below, a "releasable catch mechanism" can be used to initially retain the food item in a position to be pre-cooked prior to depositing thereof on the conveyor belt.

It is important to understand at this point in the specification that the removal of a food item from a supporting tray on the carriage means is achieved during gravitational descent of the carriage means, and that the food item is handled under gravitational forces by sliding the same through the passageway 10 upon opening of the intercompartment door panel 250.

THE COOKING COMPARTMENT AND CONVEYING MEANS

A food item which has passed from the compartment 4 into the compartment 6 and down the chute 310 is ready to be cooked. At this time the intercompartment door panel 250 has closed and the compartment 4, which is refrigerated, has been effectively sealed from the compartment 6 in which the cooking is to take place.

For purposes of providing the heat or energy to cook the food item, a bank of infra-red lamps of any suitable type are preferably incorporated. Since infra-red lamp banks are well known, the heating means has been generally designated by the numeral 22 in the drawings. It should be understood, however, that other heating means can be utilized in the apparatus hereof, including a high frequency arrangement. Still, the infra-red lamps have proved to be most satisfactory and accordingly, they are utilized in the preferred embodiment.

A food item which is moved down the chute 310 moves further, under the action of gravity, onto the conveyor belt 80. This conveyor belt moves forwardly, i.e., in the direction of the arrow C (FIGURE 1), and therefore a food item which passes on to the conveyor belt 80 is carried under the heating means 22 and forwardly within the compartment 6.

Since temperatures within the compartment 6 may reach a magnitude of the order of 1000° F., it is undesirable to mount the conveyor drive components in such compartment. It is for this reason that the transverse wall 72 of the housing means has the openings 74 and 76 therein through which the conveyor belt 80 moves respectively into the compartment 6 and out of the compartment 6. The conveyor belt 80, as shown in FIGURE 1, passes under a tensioning roller 400 which is supported on a shaft 402, and which is biased normally downward by a spring member 404. The shaft 402 moves in a socket support 408 which is fixed to the underside of the transverse wall 72. The conveyor belt 80 moreover passes over aligned drive rollers 410 and 412 which are carried on respective shafts 414 and 416 journaled in a supporting shaft bracket plate arrangement 420. The roller shafts 414 and 416 carry respective sockets 422 and 424 over which a sprocket chain 426 is entrained. The sprocket chain 426 is driven by a motor 428 carried on an adjustable support 430 which can be moved to properly tension the sprocket chain. Moreover, an idler sprocket 430 supported on an additional bracket 432 can be incorporated to properly tension the sprocket chain.

The particular drive arrangement for the conveyor belt shown in the drawings and described briefly above has been found to provide the most satisfactory results. However, the more significant factor to note is that the drive assembly is not disposed in the cooking compartment 6 but instead is disposed therebelow so that the maximum temperatures within the cooking compartment are not experienced in the area of the drive components. Instead, in the lower compartment 84, only the heat transmitted thereto by the belt and motor is encountered, and this compartment is ventilated so that such heat may pass exteriorly of the housing means 2 thereby permitting the drive components to operate at more or less normal temperatures.

The transverse wall 72 effectively serves as a partial support for the conveyor belt so that the same is maintained in a given plane while carrying a food item under the cooking means and delivering the same forwardly into the passageway 94 for removal thereof by a consumer upon opening one of the access doors a', b', c', d', or e' shown in FIGURE 2.

From the above discussion, it will be appreciated that a given food item is first removed from the carriage means upon vertical descent thereof by the transfer fingers, and that the same is then directed into the passageway 10 leading from the compartment 4 into the compartment 6. The door panel 250 is opened to permit this passage, and then closed to seal the refrigerated compartment from the cooking compartment 6. The food item then travels down the chute and onto the conveyor means, whereupon it is carried under the cooking means forwardly to the outlet passageway 94 so as to be accessible to the consumer.

THE RELEASABLE PRE-HEATING MECHANISM

For certain food items, an effective cooking can be achieved in a minimum of time, and with the conveyor belt 80 moving at a minimum speed. However, for certain food items which are stored in frozen condition, it is desirable to pre-heat or pre-cook the same initially, before finally cooking the same during slow movement under the cooking means. Thus, in accordance with the preferred modification hereof, the chute 310 is effectively replaced by a releaseable catch mechanism which is adapted to maintain a food item delivered into the compartment 6 in a given position above the conveyor means for a pre-heating or pre-cooking period, and which is then adapted to release the food item onto the conveying means for final cooking thereof.

Figure 12:
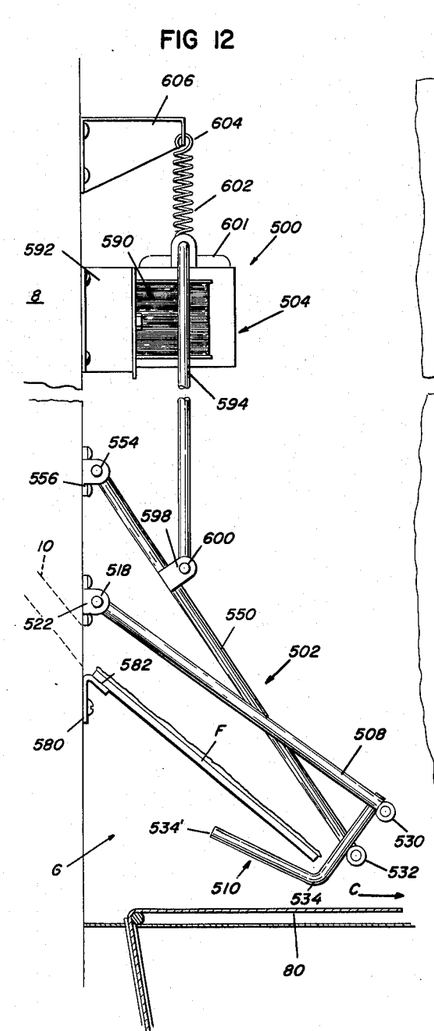
FIGURE 12 is a longitudinal sectional view of a delivery delay means used in a modified embodiment of the vending apparatus hereof, FIGURE 12 showing the same in a delayed position.

If reference is now made to FIGURE 12, it will be noted that a delivery delay means is shown therein. This delivery delay means is generally designated by the numeral 500 and is shown as being supported on the insulating wall 8. It is to be here noted that the delivery delay means would in fact be supported on the forward side of the insulating wall 8, i.e., on the same side as that to which the chute 310 is attached. For convenience in illustration, the delivery delay means as shown in FIGURE 12, is seen from the opposite side of the housing 2 from which the chute 310 was described in connection with FIGURE 1. However, the operation thereof can still easily be understood, particularly by reference to direction of movement of the conveyor belt 80 as indicated by the arrow C, and also by reference to the position of the intercompartment passageway 10 (shown in phantom line) through which a food item is delivered to the compartment 6.

The delivery delay means 500 which is disposed within the compartment 6 includes a support mechanism 502 for releaseably receiving a food item F passed through the passageway 10 in the insulating wall 8 and for maintaining the same in the compartment 6 for a pre-heating period. Further, the delivery delay means 500 includes a control means generally designated by the numeral 504 for operating the support mechanism 502 to release a food item therefrom at the end of the pre-heating period whereby the same moves onto the conveyor belt 80.

The support mechanism 502 comprises a pair of pivotally supported arm members 506 and 508 (FIGURE 13) which carry a finger food item engaging assembly 510 at one end thereof. The opposite ends of each of the arms 506 and 508 carry respectively a collar 512 and 514 which is pivotally mounted respectively on a shaft 516 and 518 cooperating with opposite upstanding legs of respective brackets 520 and 522.

Figure 13:
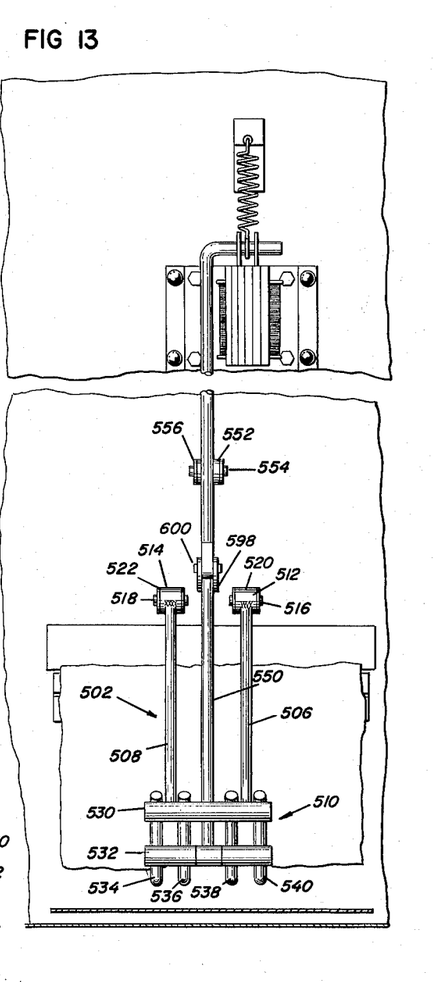
FIGURE 13 is a front elevational view of the delivery delay means shown in FIGURE 12.

The finger food item engaging assembly 510 includes a pair of cross members 530 and 532 which support four L-shaped finger members 534, 540. The support member of cross bar 530 is fixed to the forward end of the respective arms 506 and 508, whereas the support member of cross bar 532 is pivotally connected with an additional arm 550 that extends rearwardly and upwardly therefrom terminating above the upper ends of the respective arms 506 and 508. The arm 550 carries a collar 552 at the upper end thereof, which collar is rotatable about a shaft 554 supported in a bracket 556 corresponding to the brackets 520 and 522.

With the above described arrangement, the finger food item engaging assembly is movable with upward pivoting of the arms 506, 508 and 550 to a position where the lower rearward end of each finger (for example end 534' of finger 534) permits the food item to drop from the support means 502. In this regard, attention is directed to FIGURE 14 wherein respective arms 508 and 550 are clearly shown as raised to their uppermost position thereby releasing the food item F to drop the same onto the conveyor belt 80. The arm 506 assumes the same position as the arm 508 but is hidden from view in FIGURE 14 by the arm 508.

Although not specifically discussed above, it is to be here noted that a bracket 580 having a downwardly inclined upper supporting portion 582 is fixed to the insulating wall 8 adjacent the passageway 10 so as to cooperate with the finger food item engaging assembly 510 to support a frozen food item F as it is transferred to the compartment 6 for an initial preheating, in the position shown in FIGURE 12.

Quite naturally, it is desired to release the food item F from the support mechanism 502 of the delivery delay mechanism only after the food item F has been maintained thereon for a sufficient pre-heating or pre-cooking period. In other words, the delivery delay means is designed to hold the food item above the conveyor 80 and within the compartment 6 for only a limited time. Once the pre-cooking or pre-heating has been effected, then it is desired to release the food item onto the conveyor belt 80 so that the final cooking thereof may be achieved while the food item is moving forwardly from the insulating wall 8 and toward the access passageway 94 associated with the particular compartment.

To achieve the desired release, the control means 504 is incorporated. This means includes a solenoid 590 suitably mounted on a support bracket 592 also attached to the insulating wall 8 by any suitable means such as rivets. The operating rod 594 connects at its lower end with a pivot shaft 600 mounted in a bracket 598 carried by the arm 550. The upper end of the operating arm 594 cooperates with a magnetic cap 601 which is normally maintained in the position shown in FIGURE 12 by energization of the solenoid 590. A spring 602, however, normally urges the cap 601 upwardly. The spring 602 is coupled at its upper end 604 with a laterally projecting bracket 606 also mounted on the insulating wall 8.

Figures 14, 15, 16:
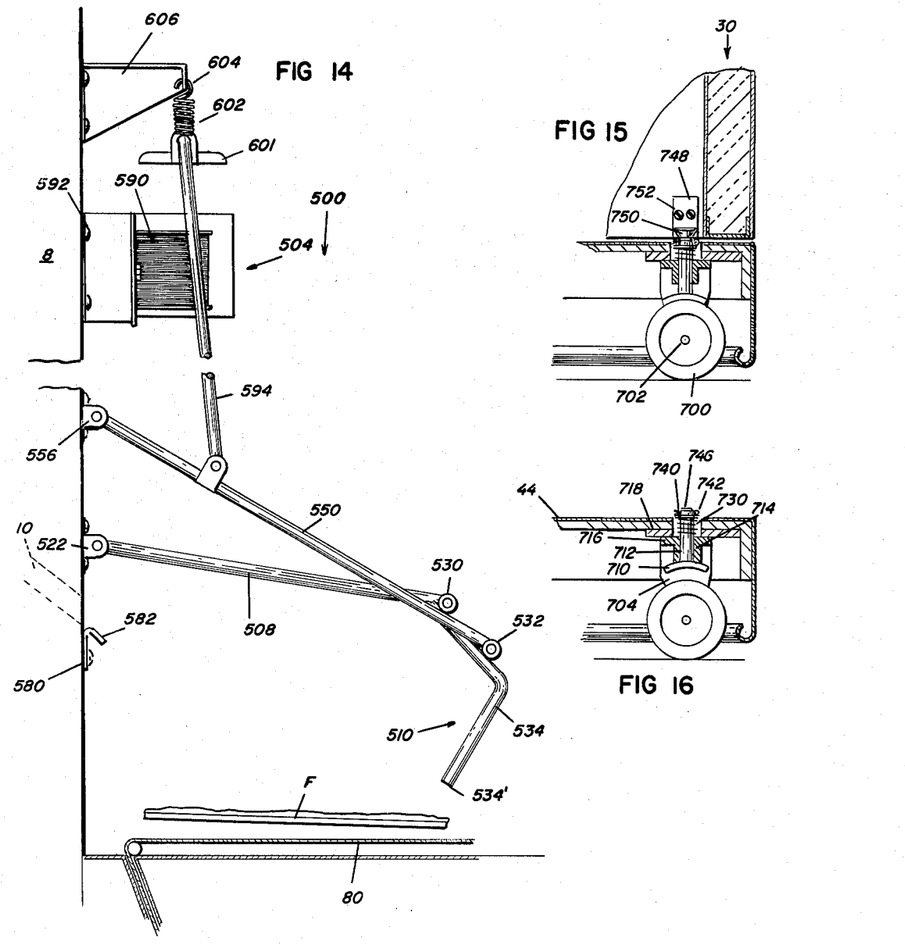
FIGURE 14 is a side elevational view similar to FIGURE 12 but showing the delivery delay means in the discharge position.
FIGURE 15 is a sectional side view of a wheel locking device provided hereby, FIGURE 15 presenting such device in its operative or locking position.
FIGURE 16 is a sectional side view similar to FIGURE 15, but showing the wheel locking device in its inoperative or wheel releasing position.

When the solenoid 590 is energized, the magnetic cap 601 is disposed on the top of the solenoid, and accordingly the operating arm 594 is in its down position, and the arms cooperating therewith accordingly maintain the finger food engaging assembly 510 in the position shown in FIGURE 12. However, when the solenoid 590 is deactivated, the same no longer attracts the magnetic cap 601 and as a result, the magnetic cap moves upwardly, to the position shown in FIGURE 14 under the action of the spring 602. As a result of this upward movement of the magnetic cap 601, the operating arm 594 is in turn moved upwardly, thereby lifting the arms 506, 508 and 550 whereupon, as also shown in FIGURE 14, the food item drops onto the conveyor 80.

After the food item has dropped onto the conveyor 80, the solenoid 590 is again energized, thereby returning the delivery delay support means to its initial position, as shown in FIGURE 12, whereupon the same is ready to receive another food item for pre-cooking or pre-heating.

Here again, it must be understood that a delivery delay means is provided in association with each cooking compartment a, b, c, d, and e just as a carriage means is provided for each cooking compartment and an intercompartment door panel and associated operating mechanism is provided for each cooking compartment. Of course, a conveyor is also provided in each cooking compartment and a radiant energy lamp means is also provided in each cooking compartment.

It is within the scope of the invention, however, to modify the above construction by using a single conveyor for all of the cooking compartments, by using a single intercompartment door panel associated with all of the compartments and by using a single heating means associated with all of the compartments. Still, it is necessary to provide a carriage in association with each compartment so that the items can be selectively dispensed depending upon their type or ingredient content. Further, it is improtant to provide a delivery delay mechanism associated with each cooking compartment where pre-cooking or pre-heating is desired so that a group of different items may be processed simultaneously.

DOOR-WHEEL LOCKING ASSEMBLY

By again referring to FIGURE 1, it will be noted that the housing means 2 is mounted on a plurality of wheels including the wheels 700 and 702. Actually, a pair of wheels 700 is provided adjacent the forward wall of the housing means and a pair of wheels 702 is provided adjacent the rear wall of the housing means. These wheels permit the convenient movement of the assembly from position to position within a given area.

Although wheel movement is desirable on a vending machine such as that provided hereby, once the vending machine has been located in a given position, it is undesirable to permit the same to be readily movable because it may be moved by unauthorized persons to undesired locations, and/or removed from the premise on such wheel means.

Accordingly, consistent with the present invention, a wheel locking arrangement is incorporated. By referring to FIGURES 1, 15 and 16, it will be noted that the wheel 700 is supported on a shaft 703 which is journaled in a bracket 704. Disposed above the wheel 700 is a brake shoe 710 which is carried on a shaft 712 that extends through the journal collar 714 and upwardly from the bracket 704 through the bottom wall 44 of the housing means 2. The journal collar 714 carries a flange 716 which underlies the cross top member 718 of the bracket 704 and which is fixed thereto. The shaft 712 is normally urged upwardly by a spring 730 which cooperates between the top of the flange 716 and a washer 740 fixed adjacent the top of the shaft 712 by a cotter pin 742. The top end 746 of the shaft 712 is disposed in the path of movement of a bracket 748 (FIGURE 15) which is carried on the inside of the front door 30. The bracket 748 has a camming base portion 750 which, when the door 30 is in its closed position as shown in FIGURE 15, rides over the upper end 746 of the shaft 712. In essence, the cam portion 750 of the bracket 748 causes the shaft 712 to move downwardly upon closing of the front door 30 and in turn, the brake shoe 710 is moved into engagement with the periphery of the wheel 700 to thereby lock the wheel in a given position. The bracket 748 is fixed to the front door 30 by any suitable means, such as by the screws 752 shown in FIGURE 15.

When an authorized individual opens the front door of the vending machine provided hereby, he immediately releases the wheel locking means described above, and accordingly, he can move the vending machine from position to position. However, once the front door is again locked, the wheel locking means or brake is in operative position and it is difficult, if not impossible, to move the wheel 700 and if a double brake is provided, to move the other front wheel which would be incorporated in association with a similar stop mechanism.

Although not specifically mentioned above, the housing means 2 additionally includes a rear door 48 which can be opened for purposes of permitting entry to the rear of the housing means. Specifically, the rear door would be opened to permit a serviceman to load the respective carriages with food items to be cooked in the apparatus provided hereby. If desired, similar wheel locking means to that described in this section of the specification could be incorporated in association with the rear door to further lock the rear wheel means.

THE REFRIGERATION SYSTEM

As indicated in the preceding discussion, a freezer and storage compartment is provided so that the food items can be maintained in a fresh condition for substantial periods of time. It should be here understood that the refrigeration unit 760 can be of any well known type which would adequately cool the coils 772 in the freezer compartment. Insofar as the invention is concerned, the important factor is that refrigeration unit is of such size that it can be easily mounted in the lowermost compartment 84 below the transverse wall 72 in the housing 2.

In FIGURE 19, a refrigeration unit 760 is mounted on the supporting surface 762 which is secured to the bottom wall 44 of the housing. A motor 764 of sufficient size and capacity to drive the compressor 766 is mounted on the rear portion thereof. In order to properly ventilate the refrigeration unit 760 and the conveyor drive means 82, a ventilating means 86 is provided in the lower portion of the front door 30. A lowered panel 88 and filter 90 are located directly in front of the motor cooling fan 768 and coils 770.

At the base portion of the insulating wall 8, is a pair of frost free fans 774. Such fans are provided so as to insure proper circulation of cool air throughout the freezer compartment 4. The freezing coils 772 are supported on the rearward surface of the insulating wall 8 and are covered by the frost free shielding 776 throughout the compartment, as seen in FIGURE 1.

THE CONTROL SYSTEM

As indicated in the preceding discussion, a control system is provided so that selective operation of the overall assembly can be obtained by a consumer who deposits the proper coin currency in the coin-receiving slot assembly 36. It should be here understood that the coin-receiving slot assembly 36 can be of any well known type which receives coins, and in response to a pre-determined currency deposit closes a switching means. The coin-receiving device may be of the type which requires an exact currency deposit, or it may be of the so-called "coin changing" type. Insofar as the invention is concerned, the important point to understand is that the coin-receiving slot assembly serves as a means for conditioning the control system for a pre-selected sequential operation. Thus, in the schematic diagram of the control system presented in FIGURES 18a, 18b, and 18c, a switch 800 is presented; such switch representing the switch which would be closed when the proper coins are deposited in the coin-receiving slot assembly. The switch arrangement, and the contacts thereof may take various forms, but for simplicity, a simple switch has been shown in this instance.

In other instances in FIGURES 18a–18c simple switches have been shown as representing the switch operation which is actually achieved. However, the particular form of contracts, switching means, and the like can be varied without departing from the scope and spirit of the invention. Again, the important factor is to understand the switching sequence and operation of the switching means, rather than the detailed construction of the particular switch assembly which is used. As indicated, various conventional switching assemblies can easily be incorporated in the control system hereof.

In order to present a description of the operation of the control system, let it be assumed that a proper currency deposit has been made, and that accordingly, the switch 800 is closed. Following closing of the switch 800, the consumer depresses a particular botton depending on the type of food item which he has selected. If pizzas are being dispensed by the machine, then the consumer may depress the button 802 for a plain pizza, he may depress the button 802a for a pizza with sausage, and similarly, he may depress the push buttons 802b, 802c, and 802d, respectively, for still other types of pizzas. Of course, the buttons can be used to select differing types of the same food item, or even widely different kinds of food items, depending on the food to be dispensed by the machine.

The operation is generally the same regardless of which button is activated or depressed, and thus for purposes of this description, it will be assumed that the consumer pushes the button 802. The remaining buttons and associated components contained within the dotted line box 820 cause generally the same sequence of operations as the button 802, as should be apparent.

Once the switch 800 has been closed, and once the button 802 has been depressed, then the relays R–1 and R–2 are coupled across the respective lines L–1 and L–2. The relays R–1 and R–2 are disposed in parallel for simultaneous energization, and the same will be energized as indicated above provided the switches 804, 814, 806 and 810 are in closed position. At the beginning of an operation such switches would normally be closed.

The switch 804 represents the micro-switch which is responsive to closing of the intercompartment door panel 250. Such switch is supported in the insulating wall 8, as shown in FIGURE 1, and whenever the door panel 250 is in its closed or up position, the switch 804 is closed.

The switch 806, on the contrary, is a limit switch which indicates an empty condition in the carriage 14. This switch can, for example, be disposed at the base of the compartment 4 and supported on or with the rack 170 so as to be engageable by the carriage means 14 as the same descends to its lowermost position. Specifically, once the carriage means 14 has descended to its lowermost position, it engages the operating finger of the switch 806, thereby opening the same. From the above explanation, it should be apparent that the carriage means 14 only descends to its lowermost position once all of the food items carried thereby have been removed therefrom. Accordingly, the switch 806 is normally closed, and only opened once the carriage means has descended to the full extent and no longer contains a food item normally supported thereon.

The switch 810, in contrast with the switches 804 and 806, is a recycle limit switch. As explained more fully below, certain timers are included in the system to effect the sequential operation. The switch 810 is linked, either electrically or mechanically, as indicated by the link 808 with a timer T–1. Should a given cycle not have been sufficiently completed for the given compartment, then the switch 810 would be open so as to prevent a customer or operator from starting another operation too soon. The switch 810 thus serves as a recycle limit means.

It should be here noted that the link 808 also connects the switch 810 with the switch 812. Thus, when the switch 810 is closed, the switch 812 is also closed. With closing of the switch 812, the lamp 816 is connected across the line L–1–2 and thus is energized when the pushbutton 802 is depressed. The lamp 816 is a "wait" light warning the customer that he must wait until a previously selected item has been sufficiently processed before he can start the operation again.

For convenience to the reader in identifying those switches which are closed by particular relays, the designation of the switches associated with the relay R–1 is given by the designation R–1n, where n is a number assigned to a particular switch associated with the relay. More specifically, R–11 represents switch 1 associated with relay R–1. Similarly, R–15 represents switch 5 associated with relay R–1. In like manner, similar designations are used for the switches associated with relay R–2, i.e., R–2–1 is switch 1 associated with relay R–2. The term "associated with relay" as used in this specification means a switch element which is operated by the particular relay. When relay R–1 is energized, it activates switches R–11 and R–15 and closes the same. This results in maintaining the relays R–1 and R–2 energied notwithstanding subsequent opening of the switch 800, the switch R–11 effectively replacing the switch 800 and the switch R–15 serving to replace the pushbuton. During the above time period, the switch 814 is closed, such switch being an overload switch operated by the thermal element SW (FIG. 18c) which prevents operation of the system in the event of excessive power drain caused by the drive motor M1.

The switch R–29 is connected in time-delay fashion with the relay R–2 whereby the switch R–29 closes a few seconds after the relay R–2 is energized. Closing of the switch R–29 serves to connect R7 across the lines L–1 and L2 thereby energizing the relay R–7. This energization of the relay R–7 results from the connections through the switch R–51 and the rack switch RS–1. The rack switch RS–1, as shown in FIGURES 1, 7 and 8 is supported on the carriage means and moves therewith with the plunger arm 900 thereof engageable with the rack teeth. By the energization of the relay R–7, the switch R–75 closes to thereby effectively maintain the relay R–7 energized and connected across the line regardless of the operation of the switch R–29. Simultaneously, the switch R–71 closes, thereby connecting the timer T–1 across the lines L–1, L–2. Also, at the time, the switch T–1b closes.

With energizing of the timer T–1 and closing of the switch T–1b, the relay R–3 is connected across the lines and simultaneously the solenoid 504 is connected across the lines. The solenoid 504, it will be remembered, was the operating solenoid for the delivery delay mechanism as explained in connection with FIGURE 12. Energization of this solenoid maintains the arms of the delivery delay means in the down position as shown in FIGURE 12 so that a food item will be maintained thereon for a predetermined period. If a delivery delay means is not incorporated, then the solenoid 504 can be eliminated together with its associated control and operating components which are not otherwise necessary.

With energization of relay R–3, switch 810 (R–35) opens to lock out the relays R–1 and R–2 for the period set on the timer T–1. Switch R–34 closes at such time to allow operation of the "wait" light as described above. With de-energization of the relays R–1 and R–2, the switches R–11 and R–15 open.

Also, with energization of the relay R–3, switch R–32 closes thereby connecting the timer T–2 across the lines L–1, L–2. Switch T–2b simultaneously closes with energization of the timer T–2.

With the energization of the timer T–2 and the closing of the switch T–2b, the relays R–4 and R–5 are energized. The switches 850 and 851 in series with the relay R–4 are thermostats which are normally closed, and only open under extreme undesirable temperature conditions within the housing.

With the closing of the relays R–4 and R–5, the cooking means or heating lamps are energized and the conveyor drive is started. More specifically, when the relays R–4 and R–5 are energized, the switches R–42 and R–53 (FIGURE 18b) and the switch R–52 (FIGURE 18c) close. Switch R–41 opens at this time. Closing of the switch R–42 serves to close the circuit for the infrared cooking means C–1 (22) by connecting the same across a 220 volt line represented in FIGURE 18b as L–2–L–3. In this instance, L–1 is the neutral line common to the 110 volt circuit employed in FIGURE 18a, the 110 volt circuit employed in FIGURE 18c, and the 110 volt and 220 volt circuits employed in FIGURE 18b. Closing of the switch R–52 (FIGURE 18c) energizes the relay RD, and as a result, the switch RD1 closes thereby connecting the motor M–1 across the 110 volt line L–1–L–2. The element SW in FIGURE 18c is the thermal element which operates switch 814 in FIG. 18a. The motor, M1 drives the conveyor, as explained above, and as shown in FIGURE 1.

With the above operations, the cooking compartment heat is turned on, and the conveyor belt 80 starts its travel thereunder.

When the radiant energy heating means has reached a maximum predetermined temperature, then the thermostat switches 850 and 851 open, thereby de-energizing the relay R–4, closing the switch R–41, and opening the switch R–42. This operation results in connecting the cooking lamp or lamps C–1 across the line L–1–L–2. In other words, at the beginning of an operation, the lamps are connected across a 220 volt line so that they reach their maximum temperature in as short a time as possible. Once the maximum temperature has been reached, however, the thermostats de-energize the relay R–4, and this results in connecting the lamp C–1 across the line L–1–L–2 (110 volt) via the path established by the switches R–53 and R–41 which are then closed.

With the energization of timer T–2 as indicated above, the switch T–2b closes. Previously, the switch R–73 had closed with operation of the relay R–7. Accordingly, the timer T–3 is connected across the line L–1–L–2.

With energization of the timer T–3 and simultaneous closing of the switch T–3b, the door solenoid 266 is connected across the line L–1–L–2, and door panel 250 is lowered to open the passageway 10 (FIGURE 10). Lowering of the door panel 250, as should be apparent, results in opening of the switch 804. The switch 804 is associated with the switch 805; the switch 804 and switch 805 representing effectively different contacts of the same switch. Thus, when the door panel opens, the switch 805 closes. With the closing of the switch 805 and the previously described operations, the rack or carriage controlling solenoid 191 is energized. With energization of the solenoid 191, the carriage is permitted to descend one step in the manner explained above, and since the door panel 250 was opened prior to such descension, a food article lifted from a tray on the carriage means can easily pass through the passageway 10 and into the cooking compartment, the sequence having been that of opening the door and then permitting the carriage means to descend so that a food item is lifted therefrom, and directed through the passageway 10.

With descension of the carriage means, the rack switch RS–1 opens thereby opening the circuit to the rack solenoid 191 and to the relay R–7. The solenoid 191 and relay R–7 are accordingly both de-energized, and the carriage is fixed in position for the next operation. With de-energization of the relay R–7, the switch R–74 opens to effectively lock out the solenoid 191, the switch R–75 opens to effectively lock out the relay R–7, the switch R–71 opens so that the timer T–1 is energized through the switch T–1b only, and the switch R–73 opens so that the timer T–3 is energized through its associated switch T–3b only.

With continued operation, the timer T–3 eventually opens its associated switch T–3b and this results in opening the circuit through the door solenoid 266. The door panel 250 accordingly closes. Timer T–1 also eventually opens its associated switch T–1b. This results in opening the circuit to the relay R–3 and through the solenoid 504 whereupon the solenoid 504 no longer maintains the delivery delay means in a holding position. Accordingly, the delivery delay means, or more specifically the arms and fingers thereof move to a position further spaced from the insulating wall at their lower end so as to release a food item previously maintained by the delivery delay means and permits the same to drop onto the conveyor belt 80.

With deactivation of the relay R–3, the switch R–32 opens and timer T–2 is energized through its associated switch T–2b only. Here it should be remembered that the switch R–11a is associated with the switch R–11, and that both of these switches are closed when the relay R–1 is de-energized. Thus, the timer T–2 continues to be connected across the line L–1–L–2 through the switch R–11a, and the timer switches T–2a and T–2b.

With the de-energization of the relay R–3, the switch R–34 opens to open the circuit to the lamp 816 or "wait light" and the switch 810 (R–35) closes to reset the relay R–1 circuit for another operation as outlined above.

The timer T–2 continues to operate until there has been a sufficient period for the heat lamp C–1 and for the belt drive motor to deliver a cooked food item to the user. A coin which would be deposited before the timer T–2 "times out" would cause the switch R–11a to open which would reset the timer T–3 so that it gives a full time to dispensing the next food item.

Switch R–33 and switch R–51 are incorporated in the circuit as a safety protection to shut off the equipment. Switch R–33 closes before switch R–51 opens to complete the circuit for relay R–7. If relay R–7 has not tripped before the timer T–1 times out, switch R–33 will trip the relay R–2 because both switches R–33 and R–51 will open at the same time in accordance with the above described sequence.

This "wait" exists because the carriage means cannot drop to a further level until the first selection has been dropped out of the catch mechanism and onto the conveyor. As an example, two customers may be lined up to operate the machine, immediately after the first person has made his selection, the second may make another selection (one of four) without any wait. But if the second person should want the same as the first selection, he may deposit his coin and push the same button. A "wait light" will light up for a very short time. This time is necessary so that the first item dispensed has time to drop out of the catch mechanism and on to the conveyor. The situation is the same for each compartment.

The thermal switch indicated as thermal SW will open in the event of an overload, and this switch is so designed that it will lock the push-buttons and prevent the machine from starting. Safety devices of this type are well known, and accordingly, further discussion of this switch appears unnecessary.

As an excess safety provision, two thermostatic switches 850 and 851 are incorporated. One of such switches operates at a higher temperature than the other, thereby serving to yield a fail-safe function. If the switch 851 operates at the lower temperature, it serves as the controlling thermostatic switch, but the switch 850, operative at a higher temperature, will be activated or energized in the event the switch 851 should fail.

CONCLUSION

Having now described the preferred and illustrative embodiments of the invention in considerable detail, it should be apparent that the objects set forth at the outset of the present specification have been successfully achieved. Moreover, it should be apparent that various modifications can be made to the illustrative embodiments without departing from the scope and spirit of the invention. Accordingly,

What is claimed is:

1. A vending machine for storing and cooking food items, said machine comprising the combination of:
   (a) housing means having at least two compartments therein separated by an insulating wall having a passageway therein through which food items can pass from one of said compartments to the other;
   (b) door means for selectively opening said passageway in said insulating wall;
   (c) carriage means for supporting a plurality of food items in individually spaced apart relation thereon;
   (d) means mounting said carriage means in one of said compartments for step-by-step movement adjacent said passageway whereby individual food items are positioned to be passed through said passageway in said insulating wall;
   (e) delivery means cooperating with said carriage means for removing food items therefrom and directing the same in a path through said passageway;
   (f) means in the other of said compartments of said housing means for cooking a food item which has been removed from said carriage means and passed through said passageway; and,
   (g) control means for selectively moving said carriage to positions where items carried thereby are adjacent said passageway, for moving said door to a position opening said passageway to permit a food item to pass through said passageway, and for cooking a food item which has passed through said passageway and into said other compartment;
   (h) said carriage means comprises an elongated frame having a plurality of inclined trays thereon for supporting food items;
   (i) said means mounting said carriage means for step-by-step movement comprises guide means cooperating with said frame to guide said frame for longitudinal movement in said one compartment and latching means cooperating between said frame and said guide means to control said longitudinal movement whereby said frame means is movable to position successive trays adjacent said passageway;
   (j) said trays are inclined downwardly from the rear portion thereof to the forward portion thereof towards said insulating wall;
   (k) each of said trays comprises a plate-like support having a plurality of elongated openings extending from the forward portion thereof toward the rear portion thereof, said forward portion being disposed adjacent said insulating wall; and
   (l) said delivery means comprises a plurality of fingers inclined upwardly from said insulating wall and positioned to move freely through said elongated openings in said trays to remove food items from said trays.

2. A vending machine as defined in claim 1 wherein said door means comprises an insulating door panel, means to mount said panel for reciprocal movement in said insulating wall, and electrically responsive means for moving said door in at least one direction.

3. A vending machine as defined in claim 2 wherein;
   (a) said combination further includes means for refrigerating said one compartment; and
   (b) said means for cooking said food in the other compartment comprises a heating means, and a conveying means for moving a food item under said heating means from a position adjacent said insulating wall to a position substantially forward thereof.

4. A vending machine as defined in claim 3 wherein:
   (a) said combination further includes a delivery delay means disposed in said other compartment, said delivery delay means including a support mechanism for releasably receiving a food item passed through said passageway in said insulating wall and maintaining the same in said other compartment for a pre-heating period; and
   (b) said control means further includes means for operating said support mechanism to release a food item therefrom at the end of said pre-heating period whereby the same moves onto said conveying means.

5. A vending machine as defined in claim 4 wherein:
   (a) said housing means includes an access door means supported forwardly of and in spaced relation to said insulating wall, said door means having at least one transparent door therein providing entry to said second compartment; and
   (b) said combination further includes wheel means for supporting said housing means, and means responsive to movement of said access door means to closed position for locking said wheel means in a given position.

6. A vending machine as defined in claim 5 wherein:
   (a) said housing means includes a bottom wall for said other compartment, said bottom wall having a pair of spaced apart openings therein; and
   (b) said conveying means includes (1) a conveyor belt disposed for movement into said other compartment through one of said openings in said bottom wall and disposed for movement from said other compartment through the other opening in said bottom wall, and (2) means disposed on the opposite side of said bottom wall from said other compartment for driving said conveyor belt.

7. A vending machine as defined in claim 6 wherein said combination further includes:
   (a) a coin receiving mechanism for activating said control means in response to depositing of a selected coin currency in said coin receiving means; and
   (b) means coupling said coin receiving mechanism with said control means.

8. A vending machine as defined in claim 1:
   (a) wherein said carriage means is moveable by gravity to positions where one edge of each tray is successively adjacent said passageway;
   (b) wherein said transfer element is fixed with respect to said carriage;
   (c) wherein said recesses are elongated and extend from the edge of each tray adjacent said passageway toward the opposite edge thereof; and
   (d) wherein said fingers are elongated and disposed to be freely moveable through said recesses to lift a food item from a tray as the tray moves past said fingers.

9. A vending machine as defined in claim 8 wherein said delivery means further includes chute means to direct an item from said fingers into said other compartment under gravity.

10. A vending machine comprising:
(a) housing means having first and second compartments therein separated by an insulating wall therebetween, said insulating wall having an opening therein;
(b) door means movable from a first position blocking said opening in said insulating wall to a second position where said opening is at least partially free of obstruction therethrough;
(c) carriage means in said first compartment having a plurality of supporting elements disposed thereon in vertically spaced apart positions whereby food items are supportable on said carriage means in spaced apart stacked relation to one another;
(d) means for reciprocally mounting said carriage means for movement past said opening in said insualting wall;
(e) means for controlling the movement of said carriage means whereby the support elements thereon are selectively movable in step-by-step relation past a discharge position opposite said opening in said insulating wall;
(f) delivery means at said discharge position cooperating with said support elements for removing a food item from said support element and causing the same to travel in a direction through said opening in said insulating wall;
(g) control means for moving said door means to said second position to permit a food item to pass through said opening and into said second compartment, and for then returning said door to said first position thereof to thereby effectively seal said first compartment from said second compartment;
(h) conveyor means in said second compartment;
(i) radiant heating means in said second compartment disposed above said conveyor means;
(j) said housing means including a dispensing opening in said second compartment;
(k) means driving said conveyor means in a direction from said insulating wall toward said dispensing opening whereby when a food item passes into said second compartment, such food item is supported by said conveyor means and is moved beneath said radiant heating means to cook said food item and to then dispense the same through said dispensing opening.

11. A vending machine as defined in claim 10 and further including means for refrigerating said first compartment.

12. A vending machine as defined in claim 11 and further including a delivery delay means disposed in said second compartment, said delivery delay means including a support mechanism for releasably receiving a food item passed through said opening in said insulating wall and maintaining the same in said second compartment for a pre-heating period, and for then releasing said food item onto said conveyor means.

13. In a vending machine, the combination of:
(a) housing means having first and second compartments therein separated by an insulating wall therebetween, said insulating wall having an opening therein;
(b) door means selectively movable to open and close said opening;
(c) radiant heating means in one of said compartments for cooking a food item placed therein;
(d) means in the other of said compartments for storing a plurality of food items and moving the same adjacent said opening in step-by-step fashion;
(e) conveying means in said one compartment in spaced relation to said radiant heating means; and
(f) control means for opening said door means to permit a food item to be passed through said insulating wall opening from said other compartment to said one compartment;
(g) said conveying means being operative to receive said food item passed through said insulating wall opening, to support said food item, and to move said supported food item past said radiant heating means for heating of said food item.

14. An apparatus for cooking food items therein comprising:
(a) a housing means having first and second compartments therein separated by a transversely extending wall means having a pair of openings therethrough;
(b) cooking means disposed in said first compartment above said wall means;
(c) conveyor means for moving a food item under said cooking means in said first compartment;
(d) drive means for said conveyor means disposed below said wall means and in said second compartment;
(e) said conveyor means comprising a conveyor belt, said conveyor belt cooperating with said drive means in said second compartment and being disposed to move through one of said openings in said wall means into said first compartment, then parallel to said wall means in said first compartment, and then through the other of said openings in said wall means to return to said second compartment.

15. A vending machine comprising:
(a) housing means having first and second compartments therein separated by an insulating wall therebetween, said insulating wall having an opening therein;
(b) door means movable from a first position blocking said opening in said insulating wall to a second position where said opening is at least partially free of obstruction therethrough;
(c) carriage means in said first compartment having a plurality of supporting elements disposed thereon in vertically spaced apart positions whereby food items are supportable on said carriage means in spaced apart stacked relation to one another;
(d) means for reciprocally mounting said carriage means for movement past said opening in said insulating wall;
(e) means for controlling the movement of said carriage means whereby the support elements thereon are selectively movable in step-by-step relation past a discharge position opposite said opening in said insulating wall;
(f) delivery means at said discharge position cooperating with said support elements for removing a food item from said support element and causing the same to travel in a direction through said opening in said insulating wall;
(g) means in said second compartment for cooking food items which have travelled through said opening;
(h) control means for moving said door means to said second position to permit a food item to pass through said opening and into said second compartment, and for then returning said door to said first position thereof to thereby effectively seal said first compartment from said second compartment;
(i) said cooking means including a conveying means for moving a food item in said second compartment, and further including a pre-heating support means for receiving a food item which has passed through said opening in said insulating wall and retaining the same in a fixed position in second compartment for a predetermined time and for thereafter releasing said food item onto said conveying means for final cooking thereof.

References Cited by the Examiner
UNITED STATES PATENTS

| | | | |
|---|---|---|---|
| 1,412,444 | 4/1922 | Baker et al. | |
| 1,675,994 | 7/1928 | Smith | 221—83 |
| 1,732,990 | 10/1929 | Smith | 221—82 |
| 1,820,517 | 8/1931 | Wells | 221—80 |
| 1,849,145 | 3/1932 | Illig et al. | 21—80 |
| 2,562,713 | 7/1951 | Harrison | 99—443 |
| 2,627,362 | 2/1953 | Balaz | 222—2 |
| 2,654,505 | 10/1953 | Fuhrman | 222—2 |
| 2,827,379 | 3/1958 | Phelan | 99—107 |
| 2,930,312 | 3/1960 | Richman et al. | 99—358 X |
| 2,945,767 | 7/1960 | Phelan et al. | 99—107 |
| 2,953,080 | 9/1960 | Gartner et al. | 99—357 X |
| 3,073,938 | 1/1963 | Turner et al. | 219—20 |
| 3,088,396 | 5/1963 | Proffitt | 99—443 |
| 3,090,470 | 5/1963 | Abrams | 188—110 |
| 3,098,918 | 7/1963 | Koci et al. | 219—20 |

CHARLES A. WILLMUTH, *Primary Examiner.*

HYMAN LORD, ROBERT E. PULFREY, *Examiners.*

STUART E. BECK, *Assistant Examiner.*